United States Patent [19]

Klutchko et al.

[11] 3,853,921
[45] Dec. 10, 1974

[54] PROCESS FOR THE PREPARATION OF 3-CYANOCHROMONES

[75] Inventors: Sylvester Klutchko, Hackettstown; Maximilian von Strandtmann, Rockaway, both of N.J.

[73] Assignee: Warner-Lambert Company, Morris Plaines, N.J.

[22] Filed: Dec. 4, 1972

[21] Appl. No.: 312,155

[52] U.S. Cl............ 260/345.2, 260/345.5, 424/283
[51] Int. Cl.............................................. C07d 7/34
[58] Field of Search...................... 260/345.2, 345.5

[56] References Cited
UNITED STATES PATENTS
2,701,254   2/1955   Hopff et al...................... 260/345.2
3,484,445   12/1969  Lee et al........................ 260/345.2 X
3,767,679   10/1973  von Strandtmann et al. ... 260/345.2

*Primary Examiner*—John M. Ford
*Attorney, Agent, or Firm*—Albert H. Graddis; Frank S. Chow; Anne M. Kelly

[57] ABSTRACT

3-cyanochromones having the following structural formula I:

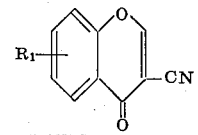

wherein $R_1$ represents hydrogen, halogen, or lower alkoxy, are prepared by heating 3-formylchromones in formic acid in the presence of hydroxylamine. The compound having formula I is useful as an anti-allergic and anti-secretory agent.

1 Claim, No Drawings

PROCESS FOR THE PREPARATION OF 3-CYANOCHROMONES

The present invention relates to novel chromone derivatives and, more particularly, the present invention relates to the preparation of novel 3-cyanochromones having the following structural formula I:

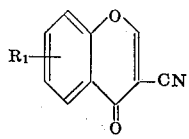

I wherein $R_1$ is hydrogen, halogen, or lower alkoxy. In the above definition for $R_1$, the alkyl portion of alkoxy is meant to include lower aliphatic hydrocarbons having from one to seven carbon atoms in the carbon chain, preferably those having one to four carbon atoms such as methyl, ethyl, propyl, isopropyl, butyl or isobutyl.

The compounds prepared by the process of this invention, which form the basis for co-pending U.S. application Ser. No. 312,154, filed Dec. 4, 1972, exhibit anti-allergic activity. Thus, for example, when they are tested in accordance with the procedure described by I. Mota, *Life Sciences*, 7, 465 (1963) and Z. Ovary and O. Bier, *Proc. Soc. Exptl. Biol. Med.*, 81, 584 (1952), they are active at a dose of 5 mg to 100 mg/kg administered parenterally or orally to mammals such as rats or guinea pigs. They are indicated in allergic manifestations such as allergic bronchitis or intrinsic asthma.

In use, the compounds prepared by the process of this invention may be combined with a parenterally acceptable vehicle such as a gum tragacanth saline suspension, to provide dosage forms suitable for parenteral administration; or they may be combined with pharmaceutical diluents such as lactose, cornstarch, microcrystalline cellulose, Polyethylene Glycol 4,000 and/or 6,000, and the like, and formulated into tablet or capsule dosage form.

Generally speaking, to treat human beings, a dose of 20–50 mg orally, or by inhalation in the form of an aerosol spray, is prescribed to give symptomatic relief of asthma. The therapeutic spectrum of these compounds may be broadened by combining them with sympathomimetic agents such as isoproterenol or with steroids such as cortisone and its derivatives.

In addition to the above pharmacological activity, the compounds prepared by the process of this invention also exhibit anti-secretory effects and gastric anti-ulcer activity in experimental animals such as rats. For example, when they are tested according to the procedure according to H. Shay, et al., *Gastroenterology:* 5, 43 (1945), in the pylorus ligated rat they exhibit an $ED_{50}$ of 20 mg to 50 mg/kg per body weight.

Further, the compounds prepared by the process of this invention are useful as intermediates for the production of other chromone derivatives. For example, they undergo solvolysis reaction to give those compounds having the following formula:

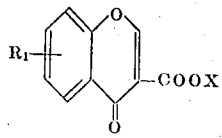

III wherein X is hydrogen or lower alkyl and $R_1$ is hydrogen, halogen, or lower alkoxy (with lower alkyl and lower alkoxy having aforementioned meanings). As an example of a solvolysis reaction there may be mentioned the use of a strong mineral acid, such as concentrated hydrochloric acid or 50 to 60 percent sulfuric acid, and temperatures of 80°C to 100°C. Compound III forms the basis of co-pending application, Ser. No. 218,503, filed Jan. 17, 1972.

According to the process of the present invention, the above compounds having formula I are prepared by treating 3-formylchromones of the formula:

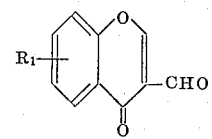

II wherein $R_1$ represents hydrogen, halogen, or lower alkoxy, in accordance with the following reaction scheme:

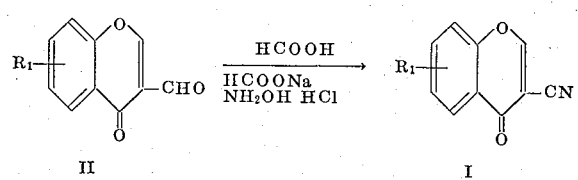

II                                    I wherein $R_1$ has the above-mentioned meaning.

Referring now to the reaction scheme, Compound II is refluxed together with hydroxylamine or a salt thereof, in the presence of sodium formate, using formic acid as the solvent. Generally, hydroxylamine hydrochloride is used in a 10 to 20 percent excess over the stoichiometric amount needed for reaction with the 3-formylchromone starting material. The sodium formate is added in excess, based on the amount of hydroxylamine. The reaction is conducted in reflux temperature, i.e., at 100°C.

Starting Compound II is prepared by oxidizing 3-(hydroxymethyl) chromones with an oxidizing agent, such as sodium dichromate with glacial acetic acid, concentrated nitric acid or potassium persulfate. The 3-(hydroxymethyl)chromones are prepared in accordance with the description set forth in co-pending U.S. application Ser. No. 309,329 filed Nov. 1972, now U.S. Pat. No. 3,798,240 issued Mar. 19, 1974.

In order to further illustrate the practice of this invention, the following examples are included:

EXAMPLE 1

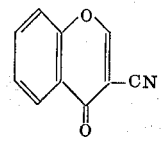

3-Cyanochromone — A mixture of 26.1 g. (0.15 mole) of 3-formylchromone, 13.1 g. (0.19 mole) of hydroxylamine hydrochloride, 18.4 g. (0.27 mole) of sodium formate and 250 ml of 99 percent formic acid was heated with stirring at reflux for 2½ hours. Water was added to 1-liter volume. The separated solid was filtered from the cooled mixture, washed well with water and dried to give 13 g. (51 percent) of crude nitrile melting at 138°–145°C. Recrystallization from ethylacetate gave pure, white crystals melting at 174°–176°.

Anal. Calcd for $C_{10}H_5NO_2$: C, 70.17; H, 2.94; N, 8.18. Found: C, 70.18; H, 3.05; N, 8.22.

EXAMPLE 2

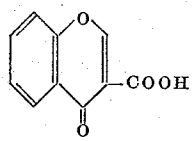

Chromone 3-carboxylic Acid — A mixture of 3.1 g. (0.018 mole) of 3-cyanochromone and 100 ml of conc. hydrochloric acid was heated at reflux for one-half hour. All solid went into solution at 15 min. and solid began to separate at the end of one-half hour. The mixture was concentrated at reduced pressure to one-half volume. Water (100 ml) was added to precipitate additional solid. The filtered solid was washed with 20 ml of water and dried to give 2.5 g. of crude acid.

Purification was effected by stirring the above crude acid with 250 ml of 5 percent sodium bicarbonate, extracting most of the undissolved solid with 50 percent ether-methylene chloride, separating aqueous phase, acidifying with conc. hydrochloric acid and filtration of separated chromone 3-carboxylic acid product; wt. 1.9 g., m.p. 190°–195°C; percent yield = 55.2. Recrystallization from ethylacetate gave pure material melting at 199°–201°C.

Anal. Calcd for $C_{10}H_6O_4$: C, 63.16; H, 3.18. Found: C, 62.93; H, 3.19.

EXAMPLE 3

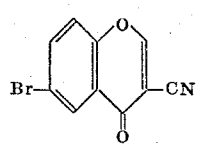

6-Bromo-3-cyanochromone — A mixture of 5.06 g. (0.02 mole) of 6-bromo-3-formylchromone, 1.53 g. (0.022 mole) of hydroxylamine hydrochloride, 2.72 g. (0.04 mole) of sodium formate and 100 ml of 99 percent formic acid was heated to reflux. The resulting solution was maintained at reflux for 2½ hours. Water (300 ml) was added to precipitate 3.1 g. of crude nitrile; m.p. 211°–215°. Recrystallization from acetonitrile-water gave 1.5 g. of purified nitrile (30 percent yield); m.p. 215°–218°. Further recrystallization from acetonitrile gave analytical quality nitrile; m.p. 216°–219°.

Anal. Calcd for $C_{10}H_4NO_2Br$: C, 48.03; H, 1.61; N, 5.60. Found: C, 47.90; H, 1.65; N, 5.54

EXAMPLE 4

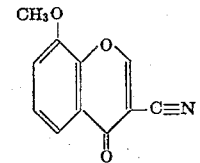

3-Cyano-8-methoxychromone — A mixture of 5.2 g. (0.026 mole) of 3-formyl-8-methoxychromone, 2.08 g. (0.03 mole) of hydroxylamine hydrochloride and 75 ml. of 97 percent formic acid was heated with stirring until all solid dissolved ($T=60°C$). A quantity of 3.4 g. (0.05 mole) of sodium formate was added. The resulting slurry was heated to reflux. After 15 minutes all solid was in solution. After 3 hours of reflux the solution was cooled, water (300 ml.) was added and the separated solid was filtered, washed with water and dried; wt 3.6 g. (68 percent); m.p. 225°–230°. Recrystallization from tetrahydrofuran gave pure nitrile; m.p. 232°–234°.

Anal. Calcd for $C_{11}H_7NO_3$: C, 65.67; H, 3.51; N, 6.96. Found: C, 65.71; H, 3.48; N, 7.05.

We claim:

1. A process for preparing a compound of the formula I:

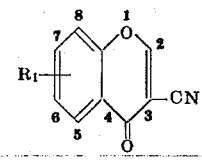

I wherein $R_1$ represents hydrogen, halogen or lower alkoxy, which comprises refluxing together a compound of Formula II,

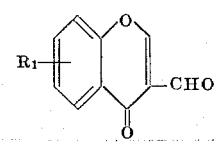

II formic acid, hydroxylamine, or a salt thereof and sodium formate.

* * * * *